United States Patent [19]
Goldberg et al.

[11] Patent Number: 5,877,779
[45] Date of Patent: *Mar. 2, 1999

[54] METHOD AND APPARATUS FOR EFFICIENT RENDERING OF THREE-DIMENSIONAL SCENES

[75] Inventors: Richard M. Goldberg, Los Gatos; Yakov Kamen, Cupertino, both of Calif.

[73] Assignee: Sun Microsystems, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 498,733

[22] Filed: Jul. 6, 1995

[51] Int. Cl.$^6$ .................................................. G06F 13/00
[52] U.S. Cl. ........................ 345/511; 345/430; 345/419; 345/521; 345/501
[58] Field of Search ................................ 395/119, 128, 395/130, 131, 501, 502, 507, 509, 520, 521, 526; 345/419, 423, 425, 430, 431, 501, 502, 507–509, 511, 520, 521, 524, 526, 525

[56] References Cited

U.S. PATENT DOCUMENTS

| | | | |
|---|---|---|---|
| 5,440,682 | 8/1995 | Deering | 395/503 |
| 5,490,240 | 2/1996 | Foran et al. | 345/430 |
| 5,493,644 | 2/1996 | Thayer et al. | 395/502 |
| 5,517,603 | 5/1996 | Kelley et al. | 395/122 |

FOREIGN PATENT DOCUMENTS

| | | | |
|---|---|---|---|
| 0 144 924 A2 | 6/1985 | European Pat. Off. | G06F 15/72 |
| 0 144 924 A3 | 6/1985 | European Pat. Off. | G06F 15/72 |
| 0 600 204 A2 | 6/1994 | European Pat. Off. | G06F 15/72 |
| 0 600 204 A3 | 6/1994 | European Pat. Off. | G06F 15/72 |

OTHER PUBLICATIONS

Foley, James D. et al., Computer Graphics: Principles and Practice, Addison–Wesley Publishing Company, Inc., 1996, 1990, pp. 855–922.

Computer Graphics, v24, No. 4, Aug. 1990, "The Rendering Architecture of the DN10000VS" by Kirk et al, pp. 299–307.

Computer Graphics, v22, No. 4, Aug. 1988, "High Performance Polygon Rendering" by Akeley et al, pp. 239–246.

*Primary Examiner*—Kee M. Tung
*Attorney, Agent, or Firm*—Conley, Rose & Tayon, PC; B. Noel Kivlin

[57] ABSTRACT

A method and apparatus for rendering an object or scene from a preselected viewpoint onto a display. The object is represented by a texture map stored in a memory of a processor-based system, and the viewpoint is represented by geometry data stored in the memory. The viewpoint on the object may be represented in the geometry data a polygon (or more than one polygon). The processor determines span data by edge-walking the polygon, and transfers the span data to the memory controller. Beginning with a first such span, the processor then transfers the span data (one span at a time) to the memory controller. After each such transfer, the memory controller takes over execution of the rendering procedure, beginning with mapping the current span onto a span of voxels (volume elements) in texture map space. The memory controller then retrieves the colors and textures for that span, and renders the span accordingly (i.e. either displays it or writes it to an appropriate memory). Control then returns to the processor, which transfers the data for the next span, and the memory controller again takes over the remainder of the rendering procedure for that span. The transfer of control back and forth is repeated until all the spans of the first such polygon are rendered, and until all such polygons have been so processed, thus greatly increasing the efficiency and throughput of graphics data in the rendering pipeline. The procedure is made more efficient by the use of a dedicated portion of memory for the graphics data, under the exclusive control of the memory controller.

19 Claims, 5 Drawing Sheets

METHOD AND APPARATUS FOR EFFICIENT RENDERING OF THREE-DIMENSIONAL SCENES

BACKGROUND OF THE INVENTION

The present invention relates to the visualization and display of three-dimensional scenes or objects on a computer system, and in particular to a new method and apparatus for accelerating the display of three-dimensional scenes. "Visualization" broadly refers to all of the steps taken by a graphics display system from accessing the 3D graphics data (of a scene or object) to rendering the data as a scene on a display device.

There are three basic types of 3D data visualization carried out by computer systems today: (1) geometry (polygon) rendering (such as wire frame rendering); (2) volume rendering; and (3) 3D texture mapping, which will typically include some features of geometry rendering. The present invention is directed specifically towards more rapid texture mapping than is available with conventional systems. For an extended treatment on methods of graphics visualization, see Foley, van Dam, et al., *Computer Graphics—Principles and Practice* (2d Ed. 1990 Addison Wesley), incorporated herein by reference.

In conventional systems, a graphics application executing on a processor will generate three-dimensional data representing an object or scene for display on a computer monitor or other display or output device. 3D geometry data are typically processed in the processor under the control of the graphics application. If the system includes a graphics accelerator, the processed data are then sent to the graphics accelerator for rendering on the monitor.

3D texture mapping is an intermediate visualization combining data from geometry rendering and volumetric data from volume rendering. Volumetric data at its simplest is simply a set of 3D pixels (discrete color values), normally referred to as "voxels". Conventional 3D texture mapping can also be combined with arbitrary cutting or clipping to reveal hidden structures within the voxel data.

Texture mapping in three dimensions is typically quite a time-consuming process. If the main processor of a computer or other processor-based system is used to carry out the rendering procedures, this can considerably degrade the performance of the system, which typically uses the processor for many other functions and processes. Dedicated graphics controllers and accelerators have been developed which can speed up the rendering procedures, but they are generally quite expensive, so that fully equipping a system with dedicated graphics modules can be prohibitive.

Some systems in use today utilize a dedicated pixel bus (a special memory bus just for the pixel data) with an extra memory controller in order to speed up the rendering/display procedure, but this increases the cost and complexity of the system.

Thus, in conventional systems a choice must be made to stress either the low cost or the high performance of the architecture.

A system is needed that answers both of these challenges—speed and expense. Ideally, a system would be provided that provides the high performance of dedicated graphics modules with the lower cost of general-purpose processors.

SUMMARY OF THE INVENTION

The present invention is directed to a system for rendering an object or scene from view-points selected by a user or a program. The system utilizes an architecture with a processor, a memory, a display device and a dedicated graphics memory controller which is configured to take exclusive control over a number of processes conventionally handled by the processor. The system is provided, in memory, with standard geometry (model coordinate) data and texture map data, and in the rendering method of the invention, the processor executes procedures to bind the model coordinate data to the texture map data, and to transform the model coordinates to device coordinates, i.e. coordinates corresponding to regions on the display device. The processor also generates conventional spans, i.e. vectors representing regions of the texture map that will eventually be displayed as scan lines on the display device.

The processor then transfers the span information, one span at a time, to the memory controller. After each such transfer, the memory controller takes over control of the rendering procedure and maps, the current span onto the voxels (volume elements) of the texture map space. Each span is in turn rendered with its assigned colors, textures, etc. to the display, or alternatively to a display memory or other memory, for later display.

Execution control is now handed back to the processor, which transmits the data for the next span to the memory controller, and then transfers control to the memory controller for texture mapping and rendering. The procedure is repeated until all the spans for a given polygon (representing the viewpoint onto the object) have been rendered. If there are other polygons, they are then processed in the same manner.

The transfer of control back and forth between the processor and the memory controller greatly increases the speed with which objects can be rendered, because the respective functions that the processor and memory controller execute are particularly efficient for those respective devices, and the memory controller's execution of the texture mapping and rendering procedures, which are especially computation-intensive, allows the processor to carry out other functions uninhibited by the multiple interrupts and general degradation of performance that would otherwise occur.

The process is made yet more efficient by the establishment of a portion of main (or cache) memory exclusively for the control of the memory controller, so that block transfers of large amounts of graphics data to and from this portion do not interfere with memory accesses to the other portions of memory by the processor.

DESCRIPTION OF THE PREFERRED EMBODIMENTS

Figure 1:
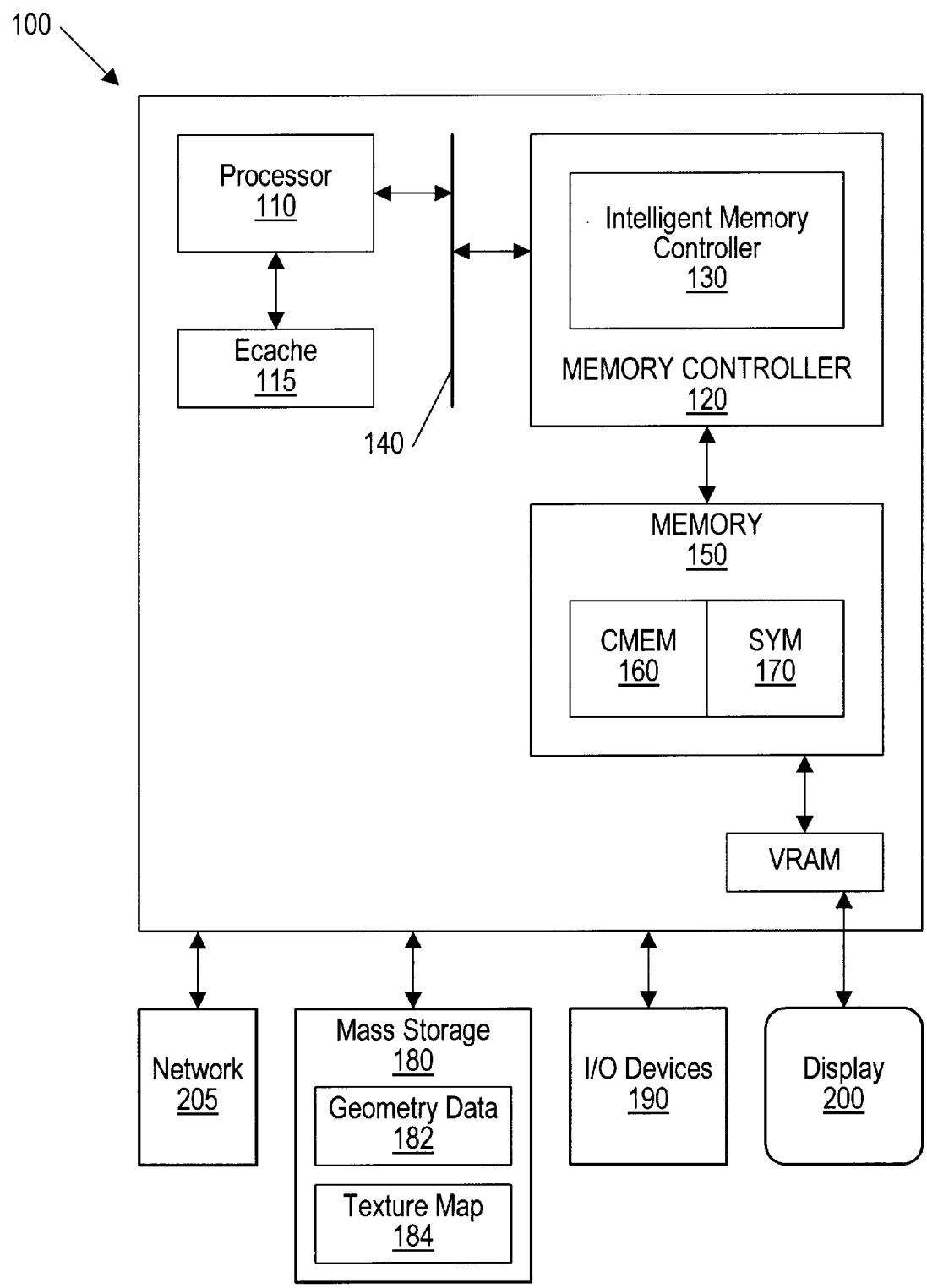
FIG. 1 is a block diagram of an apparatus incorporating the present invention.

FIG. 1 illustrates a computer system 100 of the invention, including a processor 110 coupled via a memory controller 120 including an Intelligent Memory Controller (IMC) 130 to a bus 140. The processor 110 may be a conventional microprocessor as currently used in workstations or personal computers, and the memory controller 120 is standard but for the inclusion of the IMC, whose functions are discussed in detail below.

Also coupled to the bus 140 is a main memory (such as DRAM) 150 or cache memory (e.g. SRAM), which is partitioned, preferably by not necessarily by the operating system, into contiguous memory CMEM 160 and system memory SYM 170. The IMC 130 is preferably dedicated hardware for controlling a portion the CMEM, and may for instance Sun Microsystems, Inc.'s SPARCstation 10SX memory controller chip discussed in detail in *SPARCstation 10SX Graphics Technology—A White Paper* (Sun Microsystems, Inc. 1993) incorporated herein by reference in its entirety. The basic architecture and software configuration as described in that paper may be adapted to implement the present invention. For instance, the IMC hardware is built into the motherboard of the system described there, which includes Sun Microsystems' SS10SX and SS20 model workstations. These workstations provide a suitable platform, without any hardware modifications, for the present invention; only the software necessary to implement the method steps of the present invention need be supplied, which is a straightforward matter, given the present teaching.

The processor will typically have an external cache (Ecache) 115 connected to it in a conventional manner.

The system 100 also includes disk storage 180, I/O devices 190 and a display 200 or other output device capable of graphically representing data, such as monitors and/or printers. Disk storage 180 may alternatively be any mass storage medium, volatile or involatile, including RAM, tape, CD-ROM, etc.

Network connections are made via conventional network hardware 205. The devices 180–205 may all be conventional, and may be connected to the processor in a variety of configurations, such as over the main system bus or over the memory bus, as the case may be. The particular bus connections for these peripherals is not crucial to the present invention, though the architecture of Appendix A teaches desirable configurations (such as in FIG. 2.1 on page 17), wherein the Sbus devices may include the I/O devices, network connections, mass storage, and so on. Other configurations are also usable.

The following description of the invention is primarily in terms of rendering and displaying graphics data; however, the same types of issues of efficiency, cost and speed arise in the setting of rendering graphics data for storage as files. That is, the features of the invention are independent of the destination of the rendered data—it may be a display, a printer, a Postcript file or some other type of file, another processor on a network, and so on. Accordingly, discussion below of "displaying" the output graphics data should be read as referring also to output of the graphics data to any process or device (for display, storage, etc.) desired, and "rendering to a display" or to a "display memory" should be taken broadly to include also storage to any storage medium from which the rendered data may later be retrieved.

In a typical setting where a user wishes to view 3D graphics, two types of data are stored on mass storage 180: geometry data and texture map data. The geometry data relates to the "model coordinate space", i.e. the (normally Euclidean) geometry representing the three-dimensional space in which the scene or object to be viewed is defined. Herein, the rendering of "objects" will be addressed, but it should be understood that this may apply to any three-dimensional setting with one or more objects in it.

Figure 2:
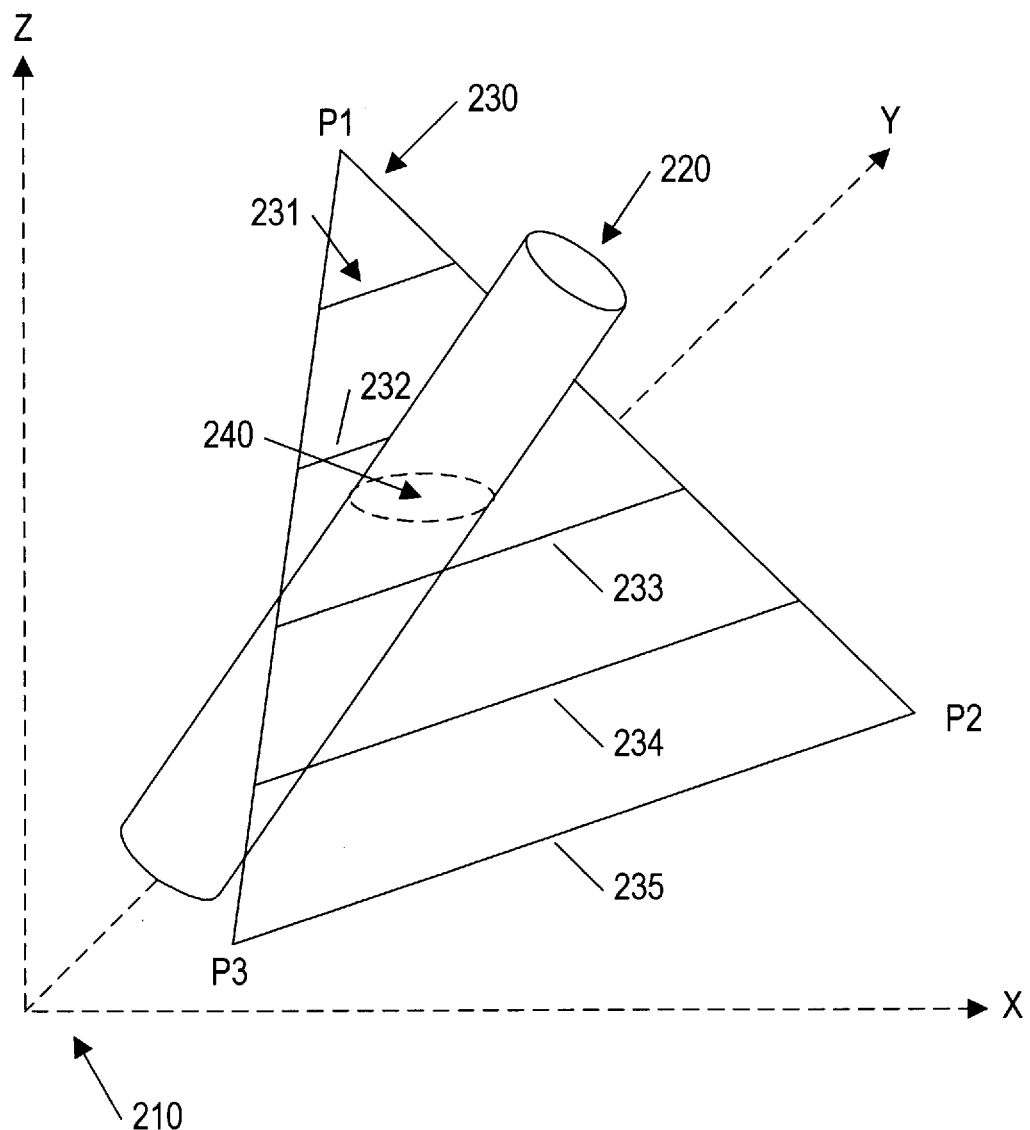
FIG. 2 is a diagram illustrating a slice-plane view on a 3D object in model coordinate space.

For example, in FIG. 2 the model space is represented by the x-y-z coordinate system 210. An object 220 is represented in a geometry data file 182 stored on mass storage 180, in a conventional fashion. This geometry data file is what is referred to in the field of graphics computing as a "list of vertices", because it generally takes the form of a representation of numerous polygons, such as triangles, into which the object has previously been tessellated. The vertices of these triangles are stored and constitute a complete representation of the object, to the limits of the resolution of the scanning, CAD or other system that generated them and to the limits of the amount of disk space available to store the resulting geometry data file.

The texture map data includes a representation of the stored object, including information about colors, textures and other details necessary to fully render the object. The texture map is stored as a data file 184 on mass storage 180. There are a number of conventional formats used in the field of graphics computing that are suitable for this purpose, such as vff (visual/volume file format) or the .obj, .nff, .wrl formats, etc. The raw sequential byte format is widely used in the field, wherein voxel data are stored for the texture map cube. Typically, the data header includes information about the dimensions of the data cube, followed by the raw byte data. For a particular implementation of a configuration utilizing applicant's commercial IMC, see *Platform Notes: SPARCstation 10SX and SPARCstation 20 System Configuration Guide* (Sun Microsystems, Inc. 1994), incorporated herein by reference in its entirety.

Figure 3:
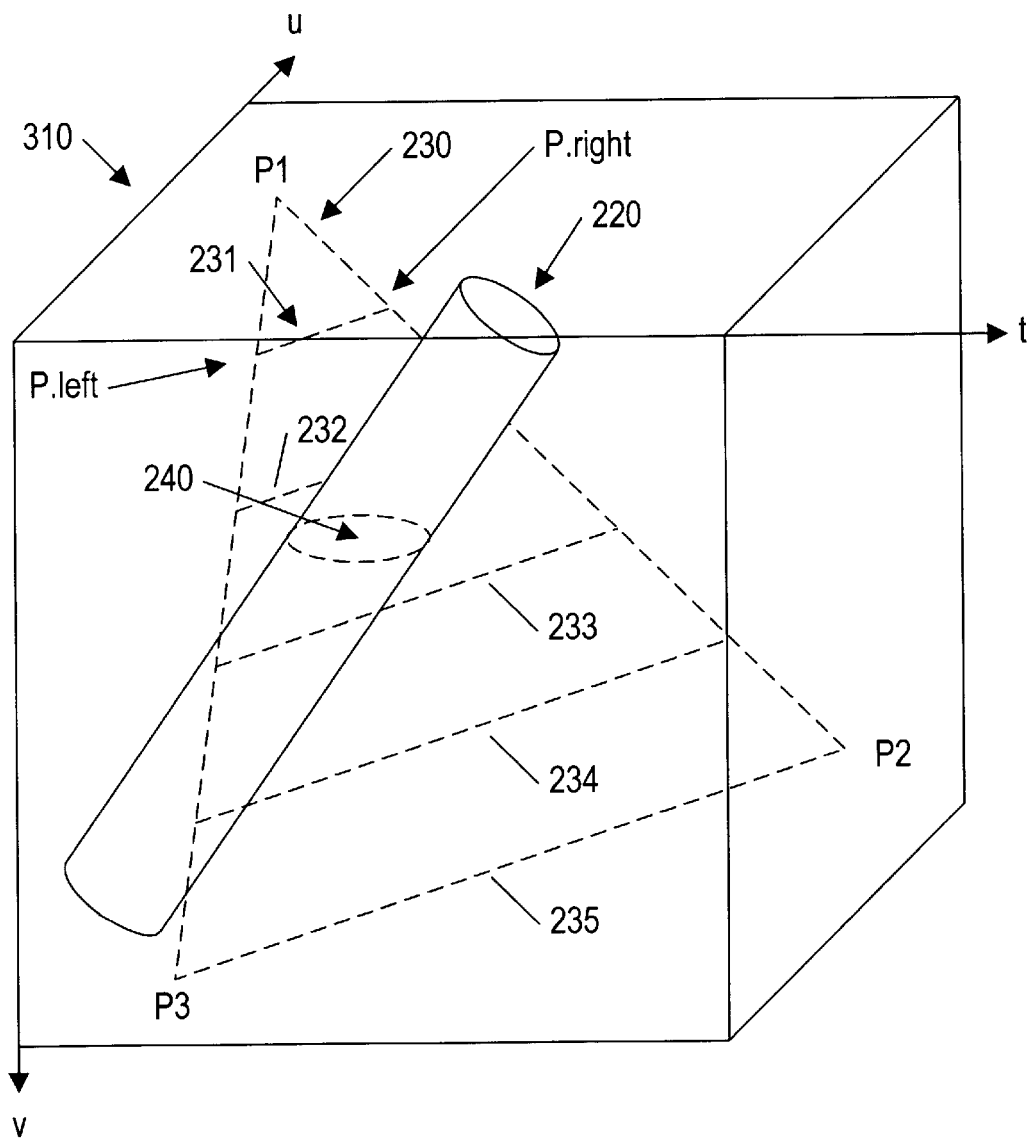
FIG. 3 is a diagram illustrating the object and view plane of FIG. 2 in 3D texture map space.

Conventionally, as shown in FIG. 3, the texture map space (which may also be referred to as the "voxel data set") is represented as a 3D Euclidean coordinate system 310 (with mutually orthogonal dimensions t, u, v). The object 220 is represented in this space as all of the information necessary to represent it from any of a number of user-selectable viewpoints, including those that slice through the object. Typically, the texture map is represented as an effective cube of data, which may be, for instance, 256 bytes on a side or approximately 16 megabytes of data.

Though the geometry 182 and texture map 184 are illustrated in FIG. 1 as separate data files, they may alternatively be represented as different portions of a single data file.

In FIG. 2, a viewing plane (or "slice plane") 230 is defined by vertices P1-P2-P3, and intersects at region 240 with the object 220. Slice plane 230 represents a point of view relative to the object 220, which may be selected by a user at a workstation (by mouse or user-entered commands), by a process of a running application, or by any other suitable mechanism, whether hardware or software. The output of the resulting rendered graphics data (monitor, output file, processor on a network, etc.) will depend upon the requesting process. Typically, for instance, a user at a workstation may want the rendered graphics data to be displayed on a monitor while an executing application may want the data to be stored in a file (thought the reverse is certainly possible and likely, as well).

When slice plane 230 is selected, region 240 is displayed on the display 200; the viewing plane may be moved and rotated to any desired position or angle. This is known in the field of graphics display systems as "slice extraction", whose procedures are well known in today's graphics display systems.

When the viewpoint on a complex scene or object is changed in a conventional system, the processor must execute considerable recalculations to determine which portions of the object are to be displayed, and to determine what textures and colors to apply to the polygons to be rendered. The processor would normally access the data in system memory (or from a network main system memory, tape drive, or any other mass storage medium, volatile or involatile) via the (conventional) memory controller, then wait as arbitration for the bus and any other conflicts are resolved, and finally when it receives the data, load it to the extent possible in its external cache. All of this competes with other executing processes, and interferes with the performance of the entire system.

The present invention greatly increases the potential speed of graphics rendering by a number of mechanisms. Instead of having the processor reload data from disk to cache each time a viewpoint is changed, the CMEM region 160 of memory is reserved for this purpose. The CMEM region is under the exclusive control of the IMC 120, which may be specified in the operating system. For instance, this is a feature of the SOLARIS operating system in applicant's SPARCstation workstations, which may be used to implement the invention. (See Appendices A and B.) The SOLARIS operating system is configured so that the software, or a user or programmer, may specify any sized portion of the memory 150 as CMEM. For instance, if the memory 150 is 32 MB, then up to 32 MB of RAM (minus the amount needed for the operating system) is available to the IMC for partitioning off as CMEM. The total of CMEM and SYM in this case will equal 32 MB.

The use of the CMEM under the control of the IMC increases processor performance dramatically because, among other reasons, the processor must execute all instructions on a clock-cycle-by-clock-cycle basis, while the IMC can block-move graphics data from the CMEM to any other portion of memory (such as to display RAM) very quickly.

Figure 4:
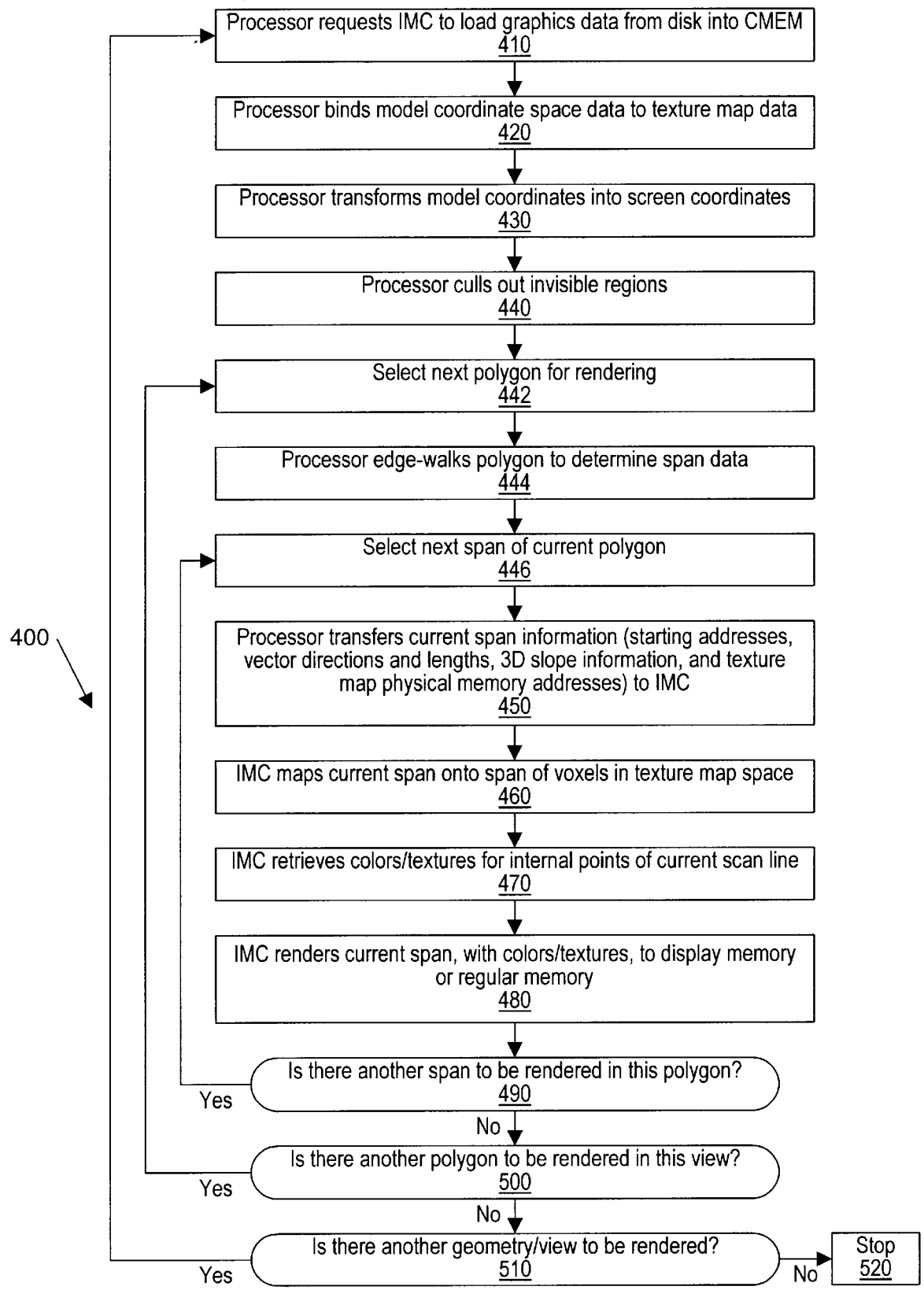
FIG. 4 is a flow chart of a method of the invention.

FIG. 4 illustrates the preferred embodiment of the method 400 of the invention. Each of the boxes in FIG. 4 represents a step or series of steps to be executed by a program or program module stored as instructions in the system memory 170 and executable by either the processor 110 or the IMC 130, as specified below. The authoring of such program modules is a straightforward matter, given the teachings of the present invention, and may be done in any suitable conventional programming language, such as C.

At box 410, the processor, at the instigation of a user or an executing process, executes an instruction to load graphics data into memory. In this embodiment, the processor sends this instruction as a request to the IMC 130 to load the geometry data 182 and texture map 184 into CMEM 180. Thus, there is no competition with other processes being executed by the processor; rather, the IMC takes over the loading of the graphics data, and moves it directly into the CMEM 160, while the processor continues to execute its ongoing processes.

At box 420, the processor binds the geometry data (in model coordinate space or MCS) to the texture map data. The input to this step is the list of vertices (x,y,z), and the output is that list of vertices correlated with the appropriate voxels in the texture map space, i.e. those voxels that correspond to the three-dimensional positions of the vertices of slice plane 230. The input to the binding procedure is thus, for the example in FIGS. 2 and 3, the list of coordinates in model coordinate space of the vertices P1-P2-P3, i.e. (x1, y1, z1; x2, y2, z2; x3, y3, z3), or in normal $$P1 = \begin{pmatrix} x1 \\ y1 \\ z1 \end{pmatrix}, P2 = \begin{pmatrix} x2 \\ y2 \\ z2 \end{pmatrix}, P3 = \begin{pmatrix} x3 \\ y3 \\ z3 \end{pmatrix} \quad \text{(Eq. 1)}$$

The binding procedure itself is conventional.

After the binding procedure, the resulting data structure is a vector in the form of P1-P2-P3=(x1, y1, z1, t1, u1, v1; x2, y2, z2, t2, u2, v2; x3, y3, z3, t3, u3, v3):

$$P1 = \begin{pmatrix} x1 \\ y1 \\ z1 \\ t1 \\ u1 \\ v1 \end{pmatrix}, P2 = \begin{pmatrix} x2 \\ y2 \\ z2 \\ t2 \\ u2 \\ v2 \end{pmatrix}, P3 = \begin{pmatrix} x3 \\ y3 \\ z3 \\ t3 \\ u3 \\ v3 \end{pmatrix} \quad \text{(Eq. 2)}$$

That is, each of the vertices P1–P3 has associated with it ("bound" to it) its own unique t-u-v coordinate in the texture map space. Typically, the user (or programmer) will supply this binding information, i.e. the correlation between the vertices in model coordinate space and their corresponding coordinates in texture map space.

At box 430, the processor transforms the model coordinates of the three points P1, P2 and P3 to screen coordinates, in a conventional manner, such as looking them up in a table or by using a transformation matrix. Then, at box 440, the processor culls out invisible regions—also done in a conventional manner.

At box 442, the next polygon is selected for rendering. On the first pass through the procedure, the first such polygon is selected as the current polygon. In the present example, there is only one such polygon, namely triangle 230.

At box 444, the processor carries out a procedure known in the field as "edge walking". This is a method of determining the data relating to the spans. The spans may generally be referred to as "discrete" data about the object; i.e, they only approximate a continuous, real-life object.

The edge walking procedure is conventional, and basically involves traversing the triangle 230 from point P1 to P3 by predetermined regular increments in the y-dimension (in screen coordinates), and interpolating for each increment the corresponding x-value for the left and right edges of the span. From this, the direction and length of the span with respect to the left-edge intersection can be determined, as well as the (t,u.v) values of the first pixel (the leftmost pixel) on that span.

The edge-walking procedure makes use of a linear interpolation procedure to determine the (tuv) coordinates for the left end of the current span. Interpolation is used because this point lies between the vertices of the triangle.

Figure 5:
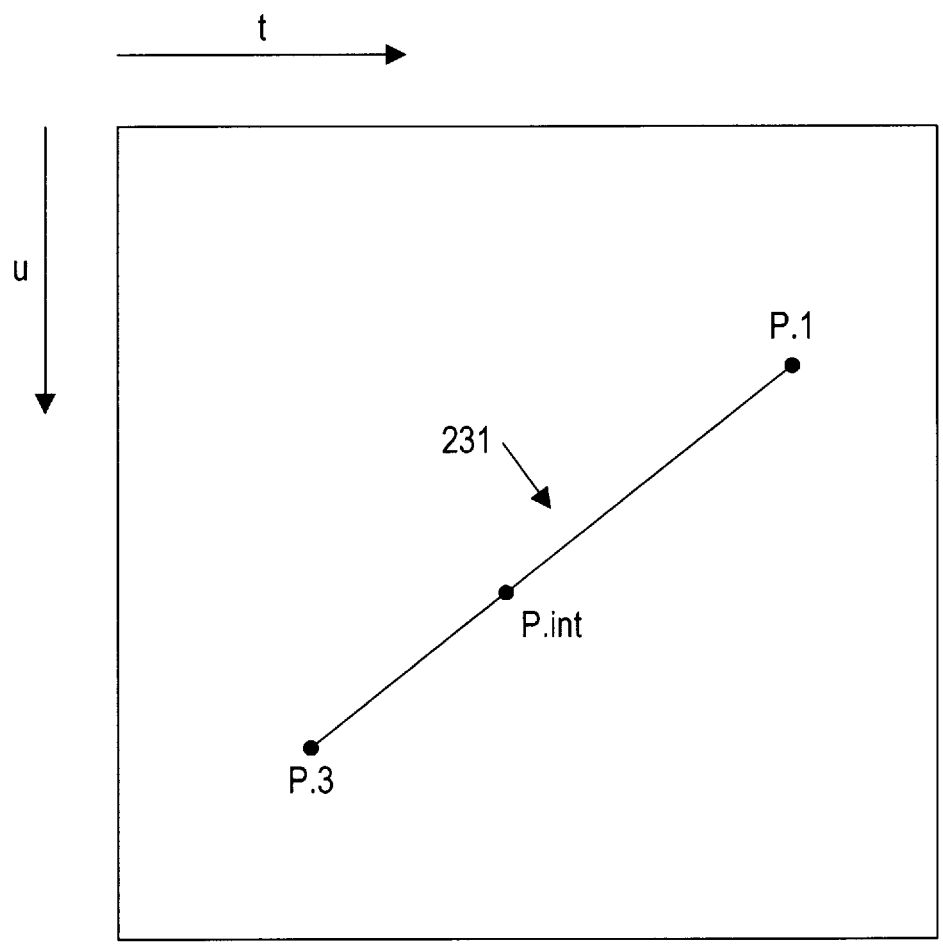
FIG. 5 is a diagram illustrating the interpolation procedure of the invention for generating spans.

For instance, in FIG. 5 scan line 231 is depicted (the rest of the polygon being omitted for the sake of clarity), projected onto dimensions (t, u) of the texture map space. P.3 and P.1 are the vertices, and P.int can be P.left of FIG. 3, or generally any point between P.2 and P.1, typically representing the left edge of a span. (It will be assumed for the purposes of illustration that the v-dimension (out of the page in FIG. 5) is constant, though that is not generally the case, and in particular is not the case in the example of FIGS. 2 and 3.)

For each intermediate point P.int along the line segment P.3–P.1, it is a straightforward matter to determine the corresponding t- and u- values in texture map space; it is simply a matter of linear interpolation. It may, for instance, be done as follows. The length (P.int–P.3) is divided by the scan length (P.1–P.3), yielding a ratio R. The t-/u- coordinates corresponding to P.3 (e.g. (t.l, u.l)) and P.1 (t.r, u.r) are determined. To determine the t-/u-coordinates (t.int, u.int)—and hence texture map addresses—corresponding to any intermediate point P.int, the following formulas may be used:

$$t.int = R*(t.r-t.l) \quad (Eq. 3)$$

$$u.int = R*(u.r-u.l) \quad (Eq. 4)$$

This is easily generalizable into three dimensions, i.e. z.int= R*(z.r-z.l) (Eq. 5). In this manner, all texture map space coordinates (and texture map addresses) can be derived from the (x, y, z) coordinates of just the endpoints of the input scan lines.

Thus, the result of edge walking (i.e. one iteration of step 444) is to generate for the current span: an associated starting point (x,y values in screen coordinates for the left intersection point, determined from a predefined table stored in memory); vector information (including length and direction); and the (tuv) coordinates for the leftmost point of each span. The "length" of the vector refers to the width of the span, in pixels, as it will appear on the display. At the end of execution of step 444, the data for one new (i.e. the current) span has been generated.

The above edge walking procedure is an efficient one, but other suitable methods could also be used; the important thing is that the geometry be organized in such a way as to map onto the texture map so that a viewpoint onto the object may be rendered on a display.

In addition to the above, at step 444 the processor also determines the 3D slope of the current scan line in texture map space. For a given span such as span 231, it is determined what the (tuv) values correspond to the (xyz) screen-coordinate system values for the left intersection point P.left and the right intersection point P.right. The rate of change of (t vs. x) is be calculated, as well as (u vs. x) and (v vs. x), as follows:

$$\frac{\Delta t}{\Delta x} = \frac{(t \cdot right - T \cdot left)}{(x \cdot right - x \cdot left)} \;;\; \frac{\Delta u}{\Delta x} = \frac{(u \cdot right - u \cdot left)}{(x \cdot right - x \cdot left)} \;; \quad (EQ.6)$$

$$\frac{\Delta v}{\Delta x} = \frac{(v \cdot right - v \cdot left)}{(x \cdot right - x \cdot left)}$$

where x.right is the x-coordinate of P.right, t.right is the t-coordinate of P.right as mapped onto the texture map space, with analogous definitions for the other (tuv) and (xyz) values in this equation.

These $\Delta t/\Delta x$, $\Delta u/\Delta x$ and $\Delta v/\Delta x$ values represent the 3D slope of a given span in texture map space.

At box 446, a new span is selected as the current span. The spans constitute the intersections of scan lines (in screen coordinates) with the slice plane 230. The spans are represented as lines 231–235 in FIGS. 2 and 3. There will typically be hundreds of these per displayed object or scene, though for clarity's sake only four are illustrated in FIGS. 2–3. These features are well known in the field of computer graphics. Thus, in FIGS. 2 and 3, spans 231–235 correspond to what will ultimately be horizontal scans across the display.

At box 450, the processor 110 transfers the information for the current span (including the left edge intersection, the vector—direction and length—data, and the 3D slope), along with the physical addresses for the texture map, to the IMC 130.

At box 460, the IMC carries out the actual texture mapping of the current span, i.e the projection of the current scan onto texture map space to determine the voxel data for each point on the span. The IMC can determine the (tuv) value for each (xyz) value in a given span in the following manner. The (tuv) value for P.left is given as input to the IMC in box 450. The IMC stores this value pair (tuv; xyz) and then calculates the (tuv) value corresponding to the next x-increment, i.e. the next pixel to the right of the current pixel on the current span, proceeding one pixel at a time (one increment of the x-value) per calculation.

At each such x-value incrementation, using the three slope values of Equations 6 the corresponding (tuv) values for the current pixel are determined. Additions based upon 3 (flesh this out) can be processed quite rapidly, more rapidly than the individual (tuv) values corresponding to the (xyz) values could be looked up in the aforementioned table, and more rapidly than divisions could be carried out. Thus, the mapping process is efficiently handled by the IMC.

At box 470, the IMC then retrieves the colors/textures for the endpoints and internal points of the current span by tabulating (looking up in a table) a linear memory address from the resultant (tuv) values. That is, each coordinate point in the texture map has an associated value for a color and intensity of the pixel that will be displayed to represent that point. This may be in the form of an actual RGB (or CYM or other format) value stored at that address in the texture map 184, or it may be a pointer or address to a table or process for determining the color value. Such a process might be a shading procedure. If a table is referenced, then actual color values may be stored in the table entries. A number of variations are possible, and can be selected by the designer of the particular implementation.

At box 480, the current scan line is rendered by the IMC, i.e. it is written to display memory (such as a VRAM or display buffer), output directly to a display, spooled for printing, written to a file, or the like. Control of the procedure is now transferred from the IMC to the processor.

At box 490, the processor determines whether there is another span to be rendered in this polygon. In the example of FIGS. 2–3, the method thus proceeds to step 446 for execution of steps 446–480 on the data representing span 232, and subsequently likewise for spans 233–235.

Once the entire triangle 230 has been processed by the steps at boxes 442–490, then at box 500 the processor determines whether there is another polygon (e.g. triangle) in this scene or view to be rendered. If so, the method proceeds to step 442, and if not the method proceeds to step 510, where the processor determines whether another view or geometry has been selected (e.g. by the user or by a program's executing process) for rendering. If so, then the method proceeds to box 410 to begin anew, and otherwise the method stops at box 520.

It will be appreciated from the foregoing that optimal use is made of both the processor and the IMC; they pass control back and forth to one another to execute those steps that are most efficient for each. Thus, the texture mapping, retrieval of voxel data and rendering steps (boxes 460–480) are all, in balance, most efficiently executed by the IMC, freeing up the processor for other tasks. The use of the dedicated CMEM by the IMC allows this to be done, and thus the processor is not tied up either by intensive graphics calculations or by massive data transfers over the bus to and from memory.

The steps that the processor does execute are, however, efficient for it to do so, and unsuitable for the IMC. Thus, high efficiency of 3D graphics rendering is achieved without great architectural complexity or the expense of a dedicated pixel bus or other dedicated hardware, but the expediency in the method of control passing between the processor and the intelligent memory controller.

What is claimed is:

1. A computer system for performing 3D texture mapping of a given representation of a graphical object, wherein said given representation of said graphical object includes a first polygon, said computer system comprising:
   a host processor;
   a system bus coupled to said host processor;
   a memory controller coupled to said host processor via said system bus, wherein said memory controller includes a graphics controller sub-unit;
   a video RAM (VRAM) coupled between said memory controller and a display device;
   a system memory coupled to said memory controller, wherein said system memory includes a dedicated portion, wherein said dedicated portion is directly accessible only by said graphics controller sub-unit for graphics-related tasks, wherein said memory controller is configured to perform block memory transfers between said dedicated portion of said system memory and said VRAM independent of said host processor and without interfering with memory accesses, wherein said memory controller is configured to perform block memory transfers between said dedicated portion of said system memory and other portions of said system memory independent of said host processor;
   wherein said computer system is configured to load 3D geometry data and 3D texture data corresponding to said graphical object into said dedicated portion of system memory, wherein said 3D texture data includes volume elements corresponding to a texture cube in 3D texture space, wherein said 3D texture cube corresponds to said graphical object; and
   wherein said graphics controller sub-unit is configured to access texture information for a first span of said first polygon by projecting each pixel in said first span onto corresponding volume elements stored in said dedicated portion of system memory, wherein said graphics controller sub-system is configured to utilize said texture information for said first span to render said first span according to said 3D texture data, wherein information relating said first span of said first polygon to said corresponding volume elements is conveyed to said graphics controller sub-unit by said host processor.

2. The computer system of claim 1, wherein said system memory includes a non-dedicated portion, and wherein said non-dedicated portion is accessible by at least said host processor via said memory controller for general purpose use.

3. The computer system of claim 1, wherein said dedicated portion of system memory is allocated during start-up by an operating system routine executing on said host processor.

4. The computer system of claim 1, wherein said 3D geometry data includes a list of vertices included in a plurality of polygons into which said graphical object has previously been tessellated.

5. The computer system of claim 1, wherein said 3D texture data includes information describing dimensions of said texture cube and texturing information for each volume element in said texture cube.

6. The computer system of claim 1, wherein said graphics controller sub-unit, in response to a command from said host processor, is configured to load said 3D geometry data and said 3D texture data corresponding to said graphical object into said dedicated portion of system memory without direct involvement from said host processor.

7. The computer system of claim 1, wherein said graphics controller sub-unit is configured to render said first span into said VRAM, thereby causing a portion of said graphical object corresponding to said first span of said first polygon to be displayed on said display device.

8. The computer system of claim 1, wherein said host processor and said graphics controller sub-unit are configured perform 3D texture mapping on remaining spans in said first polygon.

9. The computer system of claim 8, wherein said host processor and said graphics controller sub-unit are further configured to perform 3D texture mapping on remaining polygons within said given representation of said graphical object.

10. A method for performing 3D texture mapping of a given representation of a graphical object, wherein said given representation of said graphical object includes a first polygon, wherein said texture mapping is performed in a computer system including a host processor coupled to a memory controller by a system bus, wherein said computer system further includes a system memory coupled to said memory controller, said method comprising:
    storing 3D geometry data and 3D texture data corresponding to said graphical object into a dedicated portion of system memory, wherein said storing is performed by a graphics controller sub-unit included within said memory controller, wherein said dedicated portion of system memory is accessible only by said graphics controller sub-unit, and wherein said 3D texture data includes volume elements corresponding to a texture cube in 3D texture space which includes said graphical object;
    generating span data for a first span of said first polygon, wherein said generating is performed by said host processor;
    transferring said span data for said first span of said first polygon from said host processor to said graphics controller sub-unit;
    mapping said span data for said first span of said first polygon to corresponding volume elements included in said 3D texture data which is stored in said dedicated portion of system memory, wherein said mapping said span data is performed by said graphics controller sub-unit;
    rendering said first span of said first polygon according to said corresponding volume elements within said 3D texture data, wherein said rendering is performed by said graphics controller sub-unit.

11. The method of claim 10, further comprising allocating said dedicated portion of system memory is allocated during start-up of said computer system, wherein said allocating is performed by said host processor executing an operating system routine.

12. The method of claim 10, further comprising:
    tessellating said graphical object into a plurality of polygons;
    including a list of vertices in said 3D geometry data corresponding to said plurality of polygons.

13. The method of claim 10, further comprising including dimensions of said texture cube and texturing information for each volume element in said texture cube within said 3D texture data.

14. The method of claim 10, further comprising loading said 3D geometry data and said 3D texture data corresponding to said graphical object into said dedicated portion of system memory, wherein said loading is performed by said graphics controller sub-unit in response to a command from said host processor, and wherein said loading is performed without direct involvement from said host processor.

15. The method of claim 10, wherein said system memory includes video RAM (VRAM) coupled to a display device, wherein said display device is configured to display an image corresponding to pixel data stored in said VRAM.

16. The method of claim 15, wherein rendering said first span includes writing pixel data corresponding to said first span into said VRAM, wherein said writing is performed by said graphics controller sub-unit.

17. The method of claim 16, further comprising displaying a portion of said graphical object corresponding to said first span of said first polygon on said display device.

18. The method of claim 10, further comprising performing 3D texture mapping on remaining spans in said first polygon, wherein said 3D texture mapping on said remaining spans in said first polygon is performed by said host processor and said graphics controller sub-unit.

19. The method of claim 18, wherein said host processor and said graphics controller sub-unit are further configured to perform 3D texture mapping on remaining polygons within said given representation of said graphical object, wherein said 3D texture mapping on said remaining polygons is performed by said host processor and said graphics controller sub-unit.

* * * * *